(No Model.) 2 Sheets—Sheet 1.
M. FURST.
MACHINE FOR MAKING ROPE.
No. 407,522. Patented July 23, 1889.
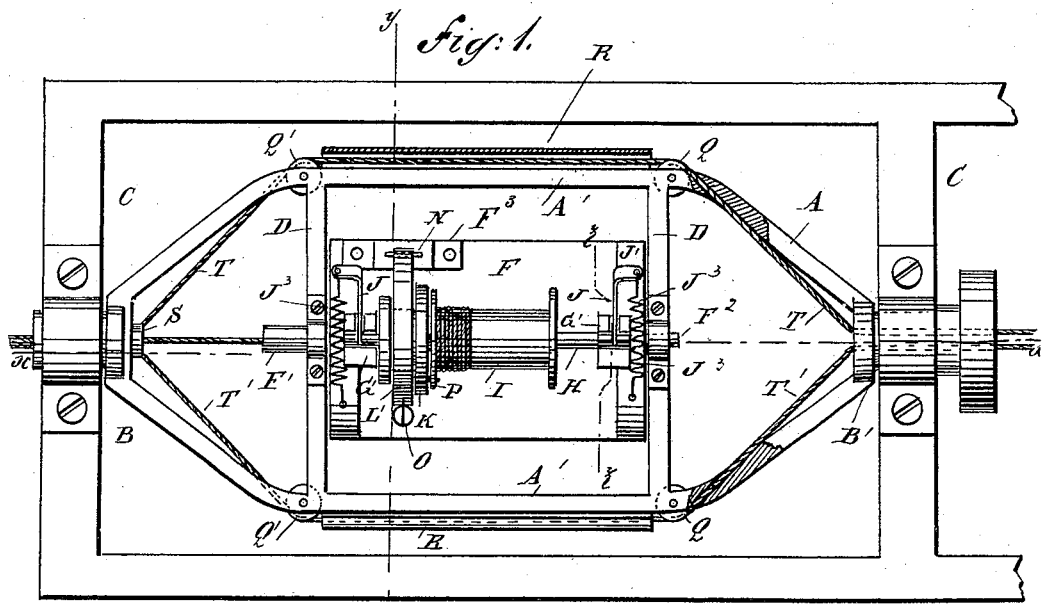
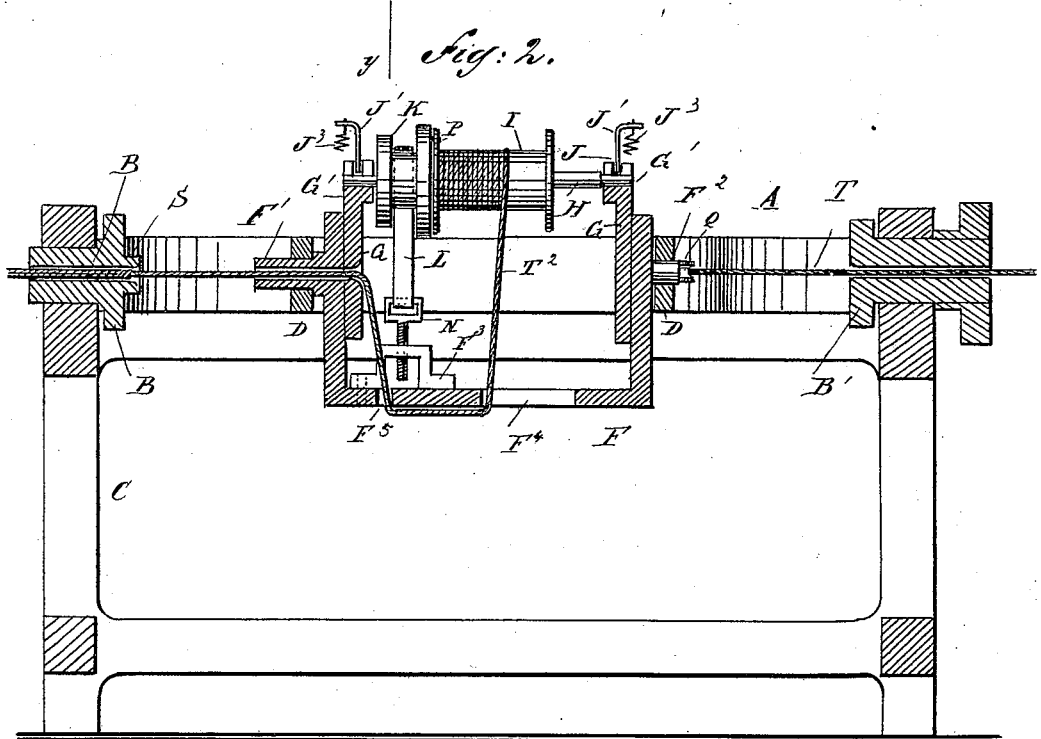
WITNESSES: INVENTOR
M. Furst
BY
Munn & Co
ATTORNEY (No Model.) 2 Sheets—Sheet 2.
M. FURST.
MACHINE FOR MAKING ROPE.

No. 407,522. Patented July 23, 1889.

WITNESSES:

INVENTOR
M. Furst
BY Munn & Co.
ATTORNEY

UNITED STATES PATENT OFFICE.

MICHAEL FURST, OF BROOKLYN, NEW YORK.

MACHINE FOR MAKING ROPE.

SPECIFICATION forming part of Letters Patent No. 407,522, dated July 23, 1889.

Application filed January 29, 1889. Serial No. 297,915. (No model.)

*To all whom it may concern:*

Be it known that I, MICHAEL FURST, of Brooklyn, in the county of Kings and State of New York, have invented a new and Improved Machine for Making Rope, of which the following is a full, clear, and exact description.

The invention relates to rope-machines of the class shown in Patent No. 23,491, dated April 5, 1859, and its object is to provide a new and improved flier which is simple and durable in construction, holds the bobbin safely in place while in operation, and permits a quick adjustment of the bobbin.

The invention consists of certain parts and details and combinations of the same, as will be hereinafter fully described, and then pointed out in the claims.

Reference is to be had to the accompanying drawings, forming a part of this specification, in which similar letters of reference indicate corresponding parts in all the figures.

Figure 3:
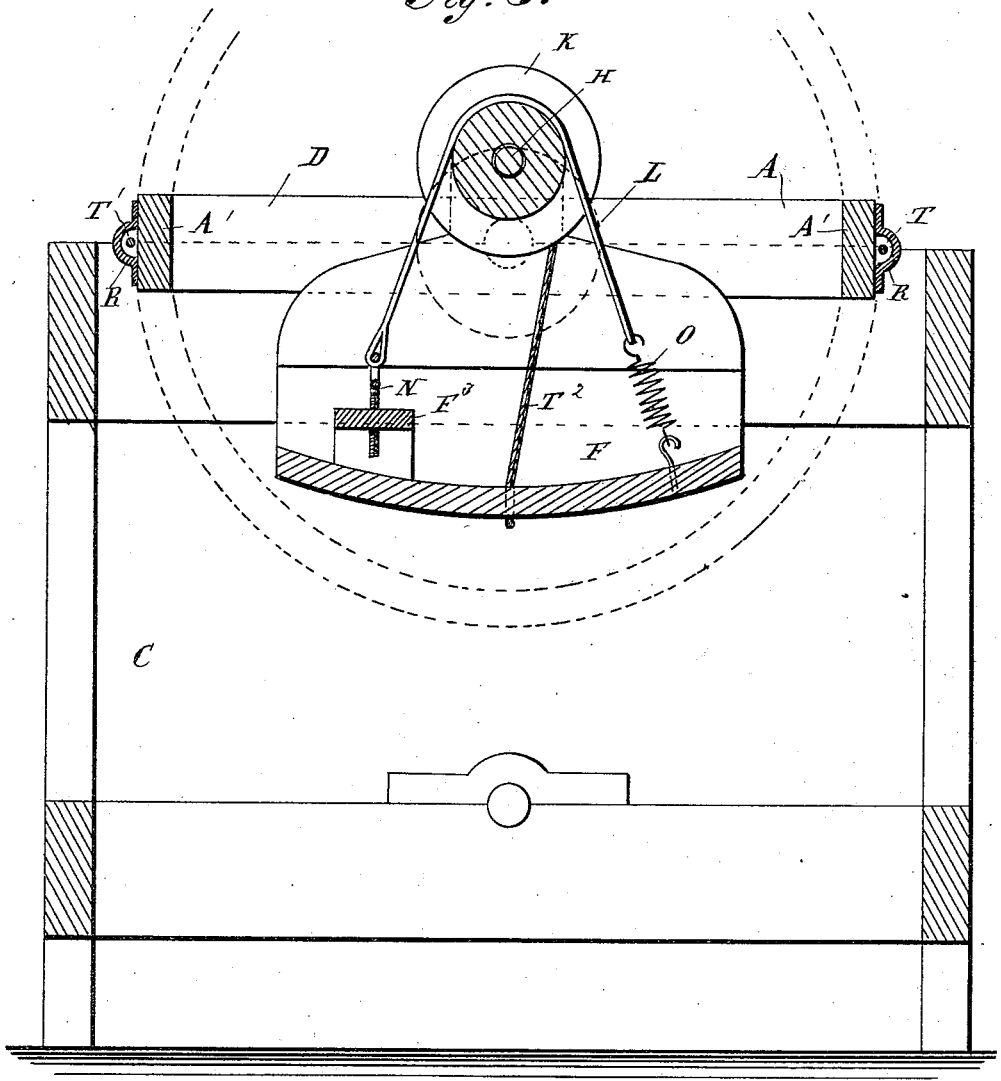
Figure 4:
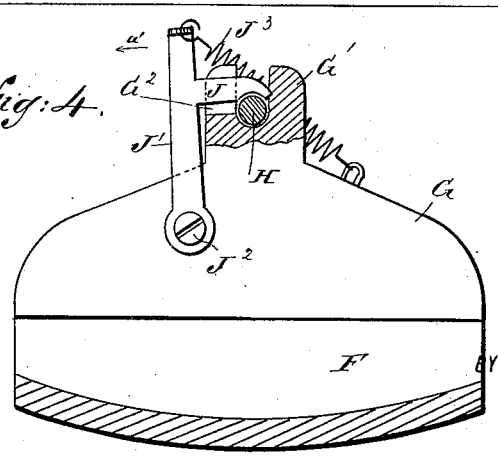

Figure 1 is a plan view of the improvement with parts in section. Fig. 2 is a sectional side elevation of the same on the line $x\ x$ of Fig. 1. Fig. 3 is an enlarged cross-section of the same on the line $y\ y$ of Fig. 1, and Fig. 4 is an enlarged cross-section of the spindle-carriage on the line $z\ z$ of Fig. 1.

The improved flier is provided with the usual flier-frame A, provided with legs A', secured to the hollow trunnions B and B', respectively, mounted to turn in suitable bearings in the main frame C, supporting the flier. The legs A' are connected with each other by transversely-extending beams D, in which are mounted, in suitable bearings, the trunnions F' and F², formed on the carriage F, supporting the spindle H, carrying the bobbin I. The ends of the legs beyond said bars or beams D are inclined toward each other, connected by said trunnions, and each leg is apertured just in advance of the ends of the said bars or beams for the passage of the strands, as shown by dotted lines in Fig. 1. The trunnion F' is hollow, while the other trunnion F² is solid, as shown in Fig. 2.

On the carriage F are formed the bearings G G, each provided at its upper end G' with a fork, into which fits the end of the spindle H, so that the latter can be easily placed in or taken out of the said bearings whenever desired. The spindle H is locked in place in the forks G' of the bearings G by arms J, (see Fig. 4,) each passing through a slot G², formed in one of the prongs of the forked end G'. Each arm J is secured to an arm J', pivoted at J² to the bearing G, and from the upper free end of the said pivoted arm J' extends a spring J³, fastened onto the carriage F, as is plainly shown in Fig. 1. The spring J³ has the tendency to pull the inner and slightly-curved end of the arm J over the spindle H, so that the latter is locked in place in the forked ends G' of the bearings G. When the operator desires to remove the spindle H from the carriage F, he presses the arms J' outward in the direction of the arrow $a'$, so that the inner curved end of the arm J disengages the said spindle H, and the latter is free to be lifted out of the bearings.

On the spindle H is secured a brake-wheel K, between the flanges of which, on top, is held a brake-band L, extending downward at its ends and secured by one end to a loop formed on the upper end of a screw-rod N, screwing into a bridge F³, formed on the bottom of the carriage F. The other end of the brake-band L is connected with one end of a spring O, secured by its other end to a hook or other suitable device fastened on the bottom of the carriage F. (See Fig. 3.) The spring O holds the brake-band L on the brake-wheel K with sufficient power to brake the latter to any desired extent.

In order to regulate the frictional contact between the brake-band L and the brake-wheel K, screw the rod N up or down in the bridge F³, and to do this unhook the spring O from its fastening in the carriage-bottom F, then turn the screw-rod up or down, as desired, and then replace the brake-band L on the wheel K, and again fasten the spring O to the carriage-bottom F, as before described. The screwing of the rod N up or down in the bridge F³ increases or diminishes the tension of the spring O, and consequently the frictional contact between the brake-band L and the pulley K. On the inner face of the latter is secured a pin P, which is adapted to extend into a corresponding aperture formed in one end of the bobbin I, so that the latter when engaging the pin P is carried around with the brake-wheel K on the spindle H.

When the operator desires to remove the bobbin I and replace it by another, he first removes the spindle H from the carriage F, as above described, then slips the bobbin I off of the free end of the spindle H, and then places another bobbin I on the spindle H, so that the aperture in one of its ends engages the pin P. The spindle H is then again replaced, as before described, and locked in place by the arms J.

On each leg A' of the flier-frame A are held the pulleys Q and Q', over which pass the strands T and T' from the other part of the machine, entering the flier through the hollow trunnion B', as is plainly shown. The strands T and T' are covered up between the pulleys Q and Q' on each of the legs A' by a cover R, secured to the outside of each leg A', as shown. These covers R prevent the strands, in case of breakage, from flying onto the carriage F and its contents, so as to be entangled with the same and finally break it. The strands T and T' after leaving the pulleys Q' pass into a plug S, held or formed on the hollow trunnion B.

The strand $T^2$ of the bobbin I is extended downward and passed through a slot $F^4$ in the bottom of the carriage F, and then along the said bottom to and through an aperture $F^5$ in the bottom, to extend upward into and through the hollow trunnion F', from which the said strand $T^2$ passes to the plug S, to be twisted with the other strands T and T' to form a rope.

The flier-frame A is rotated in the usual manner by suitable means, and the strands T and T' are passed through and over the said frame to the plug S, as before described. When the bobbin I is in place on the spindle H, its strand $T^2$ is unwound from the said bobbin by twisting with the strands T and T'.

It will be seen that when the flier-frame A is rotated the carriage F will hang loosely downward in the flier-frame A without rotating with the latter. The strand $T^2$ is unwound from the bobbin I according to the amount taken up in twisting by the strands T and T'. Any slack of the strand $T^2$ is prevented by the brake-band L engaging the brake-wheel K, and the frictional contact between the brake-band and the brake-wheel is regulated by the screw-rod N, as before described. Thus it will be seen that the flier is very simple and durable in construction and holds the bobbin safely in place while the flier-frame is rotated, and the bobbin may be quickly removed and replaced on the carriage F whenever desired.

Having thus fully described my invention, I claim as new and desire to secure by Letters Patent—

1. The combination of the flier-frame, the carriage hung loosely therein, and a spindle mounted on the carriage and having a brake-wheel provided with a pin P, for the purpose described, substantially as set forth.

2. In a flier, the combination, with the flier-frame and a carriage provided with forked bearings, of a spindle held to turn in the said forked bearings, and pivoted arms passing through slots in the said forked bearings to engage the top of the said spindle to hold the latter in place, substantially as shown and described.

3. In a flier, the combination, with the flier-frame and a carriage provided with forked bearings, of a spindle held to turn in the said forked bearings, pivoted arms passing through slots in the said forked bearings to engage the top of the said spindle to hold the latter in place, and springs engaging the said pivoted arms to hold the same over the said spindle, substantially as shown and described.

4. A flier-frame A, having parallel legs A' A', transverse bars D D, connecting said legs between their ends, the ends of legs beyond the said bars being inclined toward each other and apertured just in advance of the ends of said bars for the passage of the strands, the hollow trunnions B B, connecting the ends of said legs, the covers R, secured to the outer faces of the parallel portions of said legs, and pulleys journaled at the ends of said covers and over which the strands pass to said apertures and trunnions, substantially as set forth.

MICHAEL FURST.

Witnesses:
   THEO. G. HOSTER,
   C. SEDGWICK.